United States Patent
An et al.

(10) Patent No.: US 10,759,334 B2
(45) Date of Patent: Sep. 1, 2020

(54) SYSTEM FOR EXCHANGING INFORMATION BETWEEN VEHICLES AND CONTROL METHOD THEREOF

(71) Applicants: HYUNDAI MOTOR COMPANY, Seoul (KR); KIA MOTORS CORPORATION, Seoul (KR)

(72) Inventors: Daeyun An, Anyang-si (KR); Dong-Seon Chang, Hwaseong-si (KR); Seunghyun Woo, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/213,866

(22) Filed: Dec. 7, 2018

(65) Prior Publication Data

US 2020/0031273 A1   Jan. 30, 2020

(30) Foreign Application Priority Data

Jul. 30, 2018  (KR) .................. 10-2018-0088808

(51) Int. Cl.
| | |
|---|---|
| *B60Q 1/50* | (2006.01) |
| *B60Q 1/26* | (2006.01) |
| *B60Q 1/28* | (2006.01) |
| *B60Q 1/30* | (2006.01) |
| *B60Q 1/04* | (2006.01) |
| *B60R 11/00* | (2006.01) |
| *B60R 11/04* | (2006.01) |
| *H04N 7/18* | (2006.01) |

(52) U.S. Cl.
CPC ................. *B60Q 1/50* (2013.01); *B60Q 1/04* (2013.01); *B60Q 1/30* (2013.01); *B60Q 2300/30* (2013.01); *B60R 11/04* (2013.01); *B60R 2011/004* (2013.01); *B60R 2011/0033* (2013.01); *H04N 7/183* (2013.01)

(58) Field of Classification Search
None
See application file for complete search history.

(56) References Cited

U.S. PATENT DOCUMENTS

| | | | | |
|---|---|---|---|---|
| 5,111,182 | A * | 5/1992 | Ishikawa | B60Q 1/525 340/435 |
| 6,765,495 | B1 * | 7/2004 | Dunning | G08G 1/161 340/435 |
| 2011/0227713 | A1 * | 9/2011 | Amann | G08G 1/167 340/435 |
| 2014/0195072 | A1 * | 7/2014 | Graumann | B60W 50/14 701/2 |
| 2017/0180707 | A1 * | 6/2017 | Hsu | G01S 17/46 |
| 2018/0201182 | A1 * | 7/2018 | Zhu | B60Q 1/50 |

* cited by examiner

*Primary Examiner* — John F Mortell
(74) *Attorney, Agent, or Firm* — Morgan, Lewis & Bockius LLP

(57) ABSTRACT

A vehicle includes an image sensor configured to acquire a surrounding image; a sensor configured to detect at least one of a vehicle state or a surrounding condition of the vehicle; an external display disposed on an outer side of the vehicle; and a controller configured to identify whether a predetermined situation occurs based on at least one of the acquired surrounding image or an output value of the sensor, and configured to control at least one of a flicker frequency or a flicker pattern of the external display to display information on the occurring situation when the predetermined situation occurs.

24 Claims, 24 Drawing Sheets

FIG. 19

| INTER-VEHICLE DISTANCE | MODIFIED PATTERN | SIMPLE PATTERN | LEFT AND RIGHT LAMP PATTERN |
|---|---|---|---|
| $D < R_1$ | O | O | O |
| $R_1 \leq D < R_2$ | – | O | O |
| $d \geq R_2$ | – | – | O |

SYSTEM FOR EXCHANGING INFORMATION BETWEEN VEHICLES AND CONTROL METHOD THEREOF

CROSS-REFERENCE TO RELATED APPLICATION(S)

This application is based on and claims priority to Korean Patent Application No. 10-2018-0088808, filed on Jul. 30 2018, in the Korean Intellectual Property Office, the disclosure of which is incorporated by reference herein in its entirety

TECHNICAL FIELD

The present disclosure relates to a vehicle having a camera and an external display device and a control method of the vehicle.

BACKGROUND

Vehicles have various functions as the technology develops. Particularly, according to the tendency that a vehicle has a number of automotive electronics, an active safety system (ASS) has been developed, which operates automatically to prevent an unexpected situation.

Furthermore, in recent years, a research about a vehicle equipped with the advance driver assist system (ADAS) has been actively conducted, wherein the ADAS provides information for controlling a vehicle and information needed for a driver by integrally considering vehicle state, driver state, or information related to the surrounding conditions.

SUMMARY

It is an aspect of the present disclosure to provide a vehicle capable displaying information to be transmitted to an adjacent vehicle by adjusting a flicker frequency of an external display provided in the vehicle, capable of analyzing information transmitted from the adjacent vehicle by acquiring an image of an external display of the adjacent vehicle, and capable of using the analyzed information to control the vehicle, and a control method of the vehicle.

Additional aspects of the present disclosure will be set forth in part in the description which follows and, in part, will be obvious from the description, or may be learned by practice of the present disclosure.

In accordance with an aspect of the disclosure, a vehicle includes an image sensor configured to acquire a surrounding image; a sensor configured to detect at least one of a vehicle state or a surrounding condition of the vehicle; an external display disposed on an outer side of the vehicle; and a controller configured to identify whether a predetermined situation occurs based on at least one of the acquired surrounding image or an output value of the sensor, and configured to control at least one of a flicker frequency or a flicker pattern of the external display to display information on an occurring situation when the predetermined situation occurs.

The controller may select at least one of the flicker frequency and the flicker pattern based on the occurring situation, and control the external display according to the selected at least one of the flicker frequency and the flicker pattern.

The flicker frequency may be contained in a certain reference range, and the certain reference range may include a flicker frequency exceeding a human-readable threshold.

The image sensor may include at least one camera configured to recognize the flicker frequency exceeding the threshold.

The external display may include at least one of a headlamp provided in a front surface of the vehicle, and a rear lamp provided in a rear surface of the vehicle.

When the occurring situation is a situation occurring in the front side or a situation affecting to a rear vehicle, the controller may control at least one of a flicker frequency and a flicker pattern of the rear lamp to provide information related to the occurring situation to the rear vehicle.

When the occurring situation is a situation occurring in the rear side or a situation affecting to a front vehicle, the controller may control at least one of a flicker frequency and a flicker pattern of the headlamp to provide information related to the occurring situation to the front vehicle.

The external display may include a plurality of lamps configured to perform functions different from each other, and the controller may select at least one lamp among the plurality of lamps to display information related to the occurring situation.

The controller may select a lamp, which is already turned on, among the plurality of lamps, as a lamp to display the information related to the occurring situation.

The controller may select a lamp corresponding to the occurring situation among the plurality of lamps, as a lamp to display the information related to the occurring situation.

The controller may control at least one of the flicker frequency and the flicker pattern of the external display, based on at least one of a distance between the vehicle and the adjacent vehicle, and the presence of an obstacle between the vehicle and the adjacent vehicle.

The controller may identify at least one of the flicker frequency and the flicker pattern of the external display indicated on the surrounding image.

The controller may identify information indicated by the identified flicker frequency and the flicker pattern, and control the vehicle based on the identified information.

In accordance with another aspect of the disclosure, a control method of a vehicle includes identifying whether a predetermined situation occurs based on at least one of a surrounding image acquired by a camera provided in the vehicle, a vehicle state, or a surrounding situation of the vehicle detected by a sensor provided in the vehicle; and controlling at least one of a flicker frequency or a flicker pattern of the external display to display information on an occurring situation when the predetermined situation occurs.

The control of at least one of the flicker frequency or the flicker pattern of the external display may include selecting at least one of the flicker frequency or the flicker pattern based on the occurring situation; and controlling the external display according to the selected at least one of the flicker frequency or the flicker pattern.

The flicker frequency may be contained in a certain reference range, and the certain reference range may include a flicker frequency exceeding a human-readable threshold.

The camera provided in the vehicle may be configured to recognize the flicker frequency exceeding the threshold.

The external display may include at least one of a headlamp provided in a front surface of the vehicle, or a rear lamp provided in a rear surface of the vehicle The control of at least one of the flicker frequency or the flicker pattern of the external display may include when the occurring situation is a situation occurring in the front side or a situation affecting to a rear vehicle, controlling at least one of a flicker frequency or a flicker pattern of the rear lamp to provide information related to the occurring situation to the rear vehicle.

The control of at least one of the flicker frequency or the flicker pattern of the external display may include when the occurring situation is a situation occurring in the rear side or a situation affecting to a front vehicle, controlling at least one of a flicker frequency or a flicker pattern of the headlamp to provide information related to the occurring situation to the front vehicle.

The external display may include a plurality of lamps configured to perform functions different from each other, and the control of at least one of the flicker frequency or the flicker pattern of the external display may include selecting at least one lamp among the plurality of lamps to display information related to the occurring situation.

The selection of at least one lamp may include selecting a lamp, which is already turned on, among the plurality of lamps, as a lamp to display the information related to the occurring situation.

The selection of at least one lamp may include selecting a lamp corresponding to the occurring situation among the plurality of lamps, as a lamp to display the information related to the occurring situation.

The control of at least one of the flicker frequency and the flicker pattern of the external display may include controlling at least one of the flicker frequency and the flicker pattern of the external display, based on at least one of a distance between the vehicle and the adjacent vehicle, and the presence of an obstacle between the vehicle and the adjacent vehicle.

The control method may further include identifying at least one of the flicker frequency and the flicker pattern of the external display displayed on the surrounding image.

The control method may further include identifying information indicated by at least one of the identified flicker frequency and the identified flicker pattern and controlling the vehicle based on the identified information.

BRIEF DESCRIPTION OF THE DRAWINGS

These and/or other aspects of the disclosure will become apparent and more readily appreciated from the following description of embodiments, taken in conjunction with the accompanying drawings of which:

FIG. 19 is a table illustrating an example of a flicker pattern of the external display based on the distance from the adjacent vehicle;

DETAILED DESCRIPTION

Figure 1:
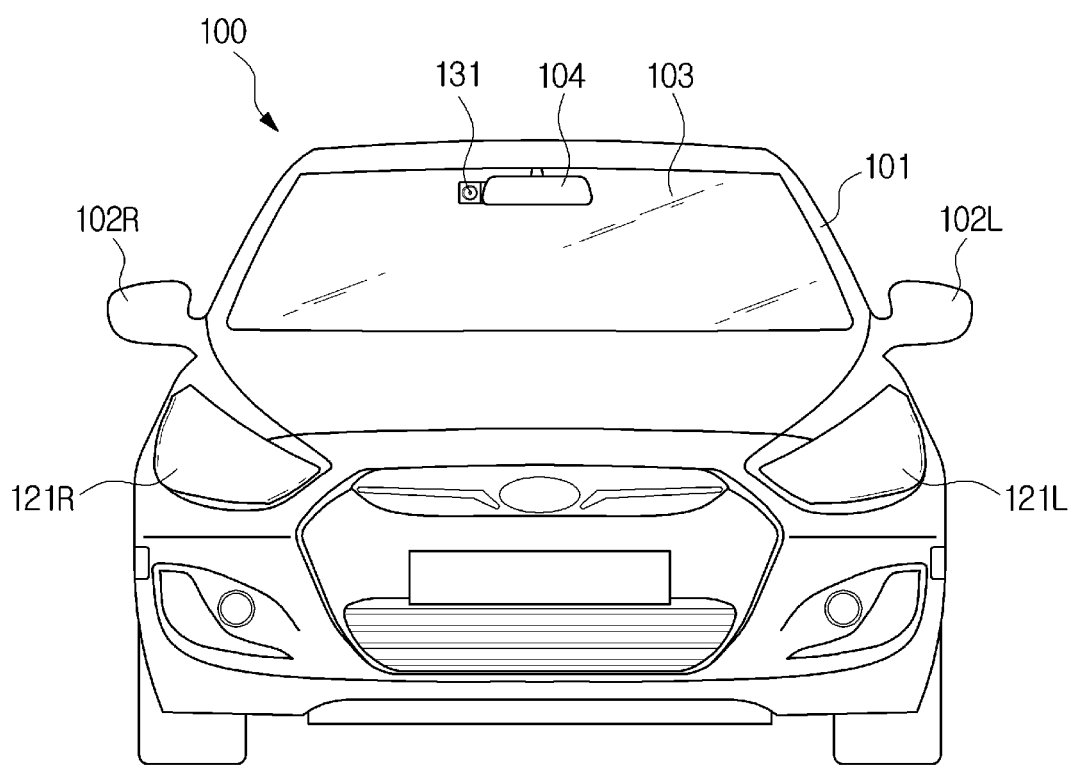
FIG. 1 is a front view of an appearance of a vehicle according to an embodiment.

Embodiments described in the present disclosure and configurations shown in the drawings are merely examples of the embodiments of the present disclosure, and may be modified in various different ways at the time of filing of the present application to replace the embodiments and drawings of the present disclosure.

In addition, the same reference numerals or signs shown in the drawings of the present disclosure indicate elements or components performing substantially the same function.

The terms used herein are used to describe the embodiments and are not intended to limit and/or restrict the present disclosure. The singular forms "a," "an" and "the" are intended to include the plural forms as well, unless the context clearly indicates otherwise. In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

Reference will now be made in detail to embodiments of the present disclosure, examples of which are illustrated in the accompanying drawings.

Figure 2:
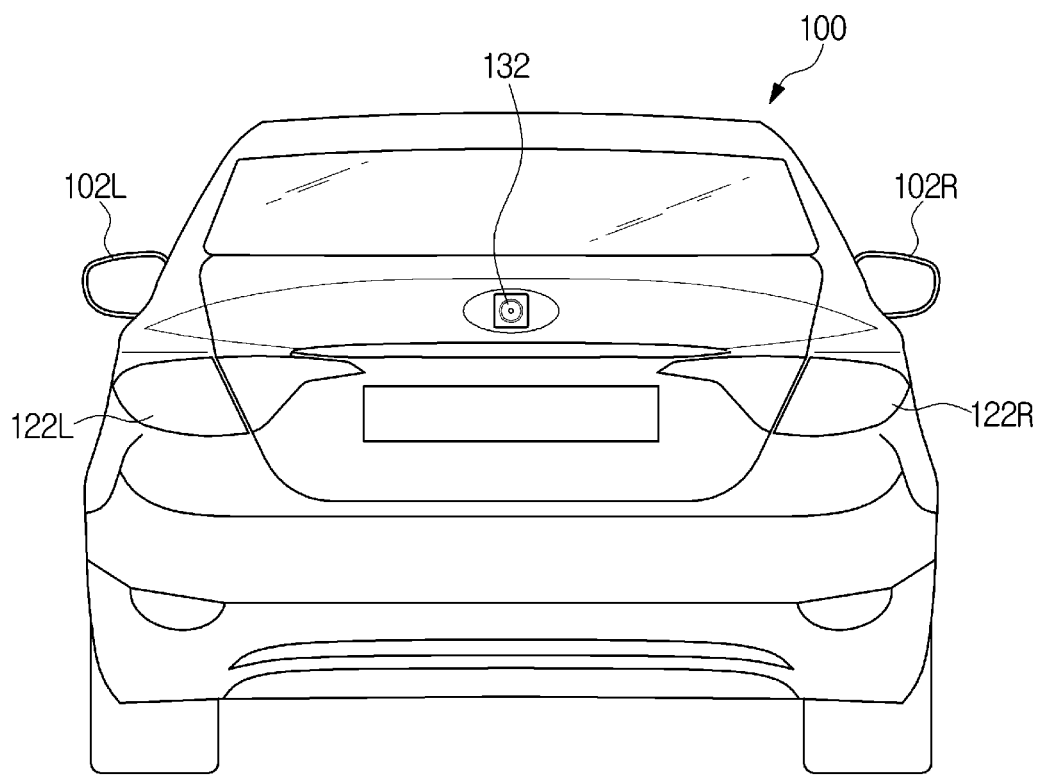
FIG. 2 is a rear view of the appearance of the vehicle according to an embodiment.

FIG. 1 is a front view of an appearance of a vehicle according to an embodiment, and FIG. 2 is a rear view of the appearance of the vehicle according to an embodiment.

Referring to FIG. 1, a vehicle 100 may include a body 101 forming an exterior of the vehicle 100, a windscreen 103 providing a front view to a driver, and a side mirror 102R and 102L providing a view of the rear side of the lateral side of the vehicle 100 to the driver. The side mirrors may include a right side mirror 102R providing a right rear view and a left side mirror 102L providing a left rear view. The interior of the vehicle 100 may be provided with a room mirror 104 providing a rear view to the driver.

A front camera 131 acquiring a front image of the vehicle 100 may be provided around the room mirror 104. The front camera 131 may acquire a moving image or periodically acquire a still image.

FIG. 1 illustrates that the front camera 131 is mounted on the side of the room mirror 104, but the embodiment of the vehicle 100 is not limited thereto. Therefore, the front camera 131 may be mounted outside the vehicle 100 such as mounted to in the vicinity of a grill on a front surface of the vehicle 100 or mounted to a bumper. The front camera 131 may be mounted in a position capable of acquiring a front image, particularly, a position where the front camera is able to acquire a front vehicle that is ahead of the vehicle 100.

In addition, a single front camera 131 is provided but is not limited thereto. Therefore, a plurality of front cameras 131 may provide a wider view. Alternatively, the front camera 131 is implemented by a stereo camera to provide a front image as a three dimensional image.

Headlamps 121R and 121L may be provided on the front surface of the vehicle 100. The headlamps may include a right headlamp 121R provided on the right front surface of the vehicle 100 and a left headlamp 121L provided on the left front surface.

It may be possible that a headlamp represents a high beam and a low beam, but in the embodiment, a headlamp includes all of lamps mounted to the front surface of the vehicle 100. Therefore, in the embodiment described below, the headlamp refers to at least one of a plurality of lamps mounted on the front surface of the vehicle 100. A description of the headlamp will be described in detail later.

As illustrated in FIG. 2, rear lamps 122L and 122R may be provided on the rear surface of the vehicle 100. The rear lamp may include a right rear lamp 122R provided on the right rear surface of the vehicle 100, and a left rear lamp 122L provided on the left rear surface of the vehicle 100.

In this embodiment, the rear lamps 122L and 122R are defined to include all lamps mounted on the rear surface of the vehicle 100. Therefore, in the embodiment described later, the rear lamp refers to at least one of a plurality of lamps mounted on the rear surface of the vehicle 100. A description of the rear lamps will be described later.

A rear camera 132 acquiring a rear side image of the vehicle 100 may be provided on the rear surface of the vehicle 100. The rear camera 132 may acquire a moving image or periodically acquire a still image.

FIG. 2 illustrates that the rear camera 132 is mounted around a license plate but the embodiment of the vehicle 100 is not limited thereto. Therefore, the rear camera 132 may be mounted inside of the vehicle 100. The rear camera 132 may be mounted in a position capable of acquiring a rear image, particularly, a position where the rear camera is able to acquire a rear vehicle that is behind of the vehicle 100.

In addition, a single rear camera 132 is provided but is not limited thereto. Therefore, a plurality of rear cameras 132 may be installed to provide a wider view. Alternatively, the rear camera 132 is implemented by a stereo camera to provide a front image as a three dimensional image.

It is also possible to provide a surround view by installing a camera on other positions such as the lateral side, other than the front and rear sides of the vehicle 100.

Figure 3:
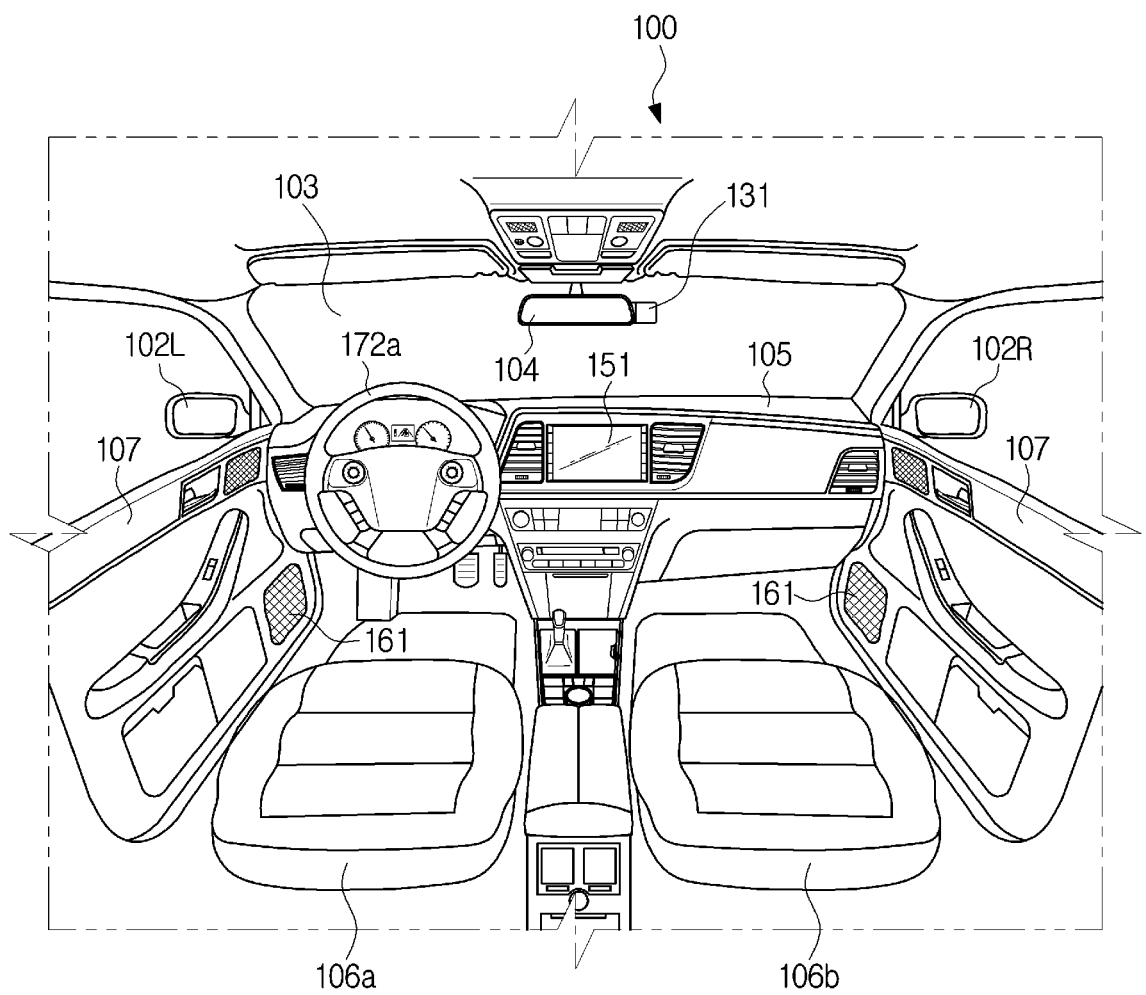
FIG. 3 is a view of an interior of the vehicle according to an embodiment.

FIG. 3 is a view of an interior of the vehicle according to an embodiment.

Referring to FIG. 3, an audio video navigation AVN display 151 configured to display a screen required for performing functions such as an audio function, a video function, a navigation function, and a calling function may be provided on a center fascia 105 corresponding to a center portion of a dashboard inside of the vehicle 100, and an inputter configured to receive a user's control command may be provided in the vicinity of the AVN display 151, in a steering wheel 181 or a place between a driver seat 106a and a passenger seat 106b.

The AVN display 151 may display a screen for providing information acquired from another vehicle as described later, as well as a screen needed for performing the above-described functions.

The Information acquired from another vehicle may also be provided audibly. In this case, information acquired from another vehicle may be output through a speaker 161 provided in the vehicle 100. For example, the speaker 161 may be provided inside the door 107, but the position of the speaker 161 is not limited thereto. For example, the speaker 161 may be provided in any position if it is able to provide audio information to the driver in the vehicle 100.

Figure 4:
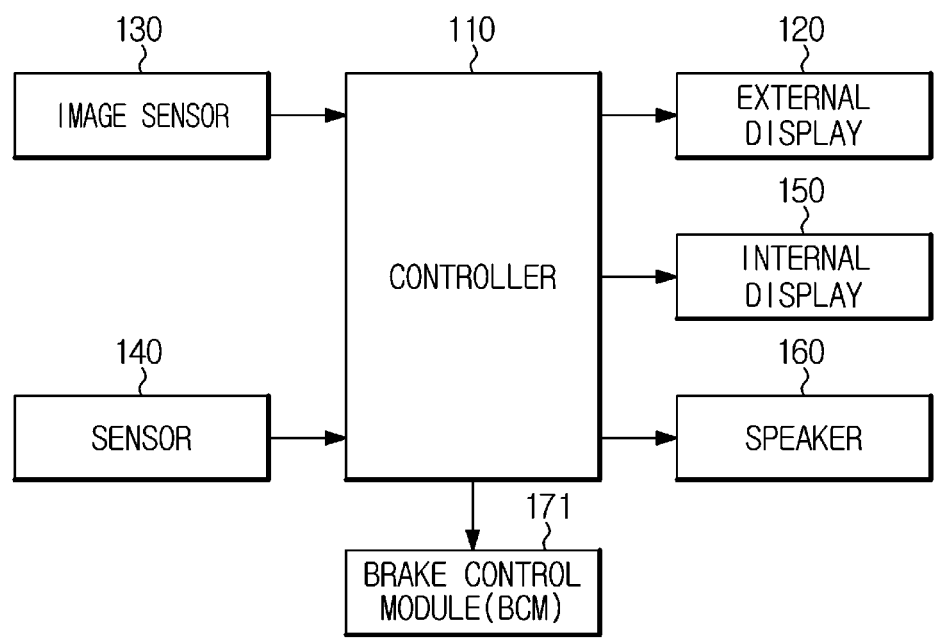
FIGS. 4 and 5 are block diagrams of the vehicle according to an embodiment.
Figure 5:
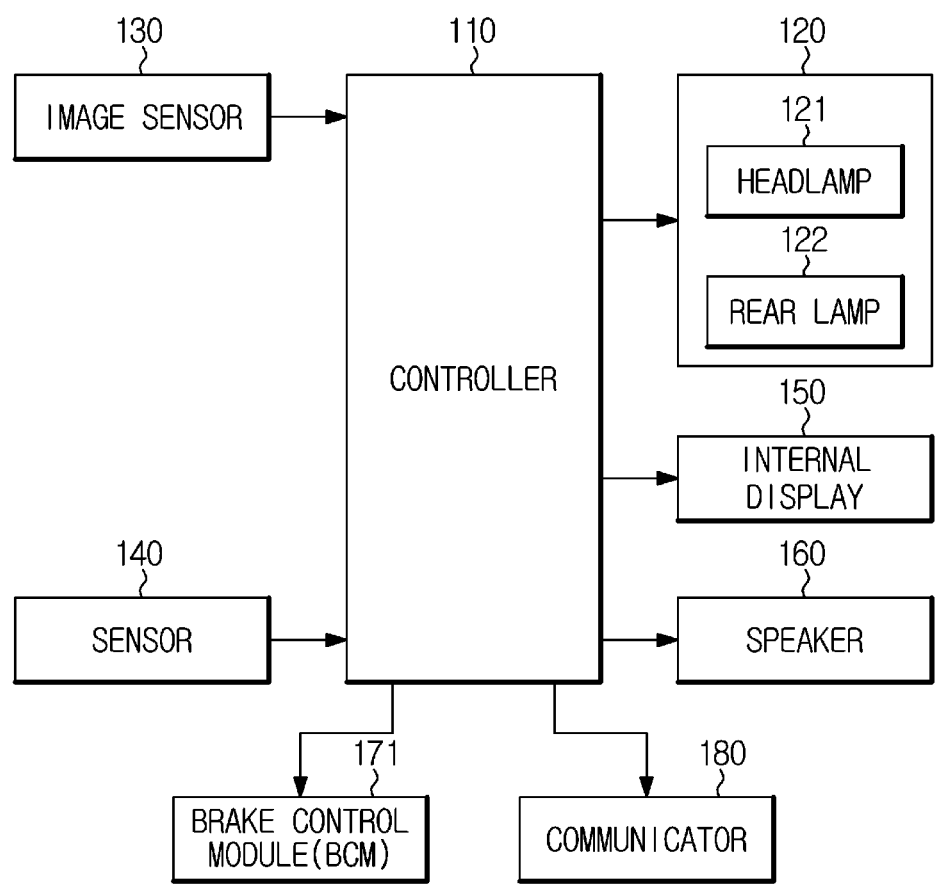

FIGS. 4 and 5 are block diagrams of the vehicle according to an embodiment. Hereinafter, an operation of the vehicle 100 according to an embodiment will be described in details with reference to the configuration of the vehicle 100 described above and the control block diagram of FIGS. 4 and 5.

Referring to FIG. 4, according to an embodiment, the vehicle 100 includes an image sensor 130 acquiring a surrounding image of the vehicle 100, a sensor 140 detecting at least one of vehicle state and surrounding conditions of the vehicle 100, a controller 110 identifying whether a predetermined situation occurs based on at least one of the surrounding image, the vehicle state and the surrounding conditions of the vehicle 100, and an external display 120 displaying information on the occurring situation.

In addition, according to an embodiment, the vehicle 100 may be a provider of the information and at the same time a receiver of the information. To this end, the vehicle 100 may further include an internal display 150 visually outputting information provided from the adjacent vehicle, a speaker 160 audibly outputting information provided from the adjacent vehicle, and a brake control module (BCM) 171 braking the vehicle 100 based on information received from the adjacent vehicle.

The controller 110 may be configured to identify information provided from the adjacent vehicle by analyzing surrounding images acquired by the image sensor 130, and brake the vehicle 100 by controlling the brake control module 171 based on the identified information or output the identified information by controlling the internal display 150 or the speaker 160.

In the present disclosure, the brake control module (BCM) 171 may include an anti-lock braking system (ABS) or electronic stability control (ESC).

The controller 110 may include at least one memory storing a program for performing the above-described operations and operations to be described later, and at least one processor executing the stored program. When a plurality of memories and processors are provided, they may be integrated on one chip, or they may be provided in physically separated positions. The controller 110 may be an electronic control unit (ECU).

The image sensor 130 may include the front camera 131 acquiring a front image of the vehicle 100. The image sensor 130 may further include the rear camera 132 acquiring a rear image of the vehicle 100. The surrounding image may include a front image and a rear image. If there is another vehicle running around the vehicle 100 (hereinafter referred to as an adjacent vehicle), the adjacent vehicle may appear in the surrounding image.

The adjacent vehicle may include a front vehicle and a rear vehicle, and the front vehicle may appear on the front image and the rear vehicle may appear on the rear image.

When the front vehicle drives in the same direction as the vehicle 100, a rear surface of the front vehicle may appear on the front image, and when the front vehicle drives in a direction opposite to the vehicle 100, that is the vehicle 100 faces the front vehicle, a front surface of the front vehicle may appear on the front image.

When the rear vehicle drives in the same direction as the vehicle 100, a front surface of the rear vehicle may appear on the rear image, and when the rear vehicle drives in a direction opposite to the vehicle 100, a rear surface of the rear vehicle may appear on the rear image.

In addition, on the surrounding image acquired by the image sensor 130, lanes of a road on which the vehicle 100 drives may appear, and obstacles placed around the vehicle 100 may appear. In addition, the surrounding conditions such as unexpected situations or emergency situations occurring around the vehicle 100 may appear on the surrounding image acquired by the image sensor 130. Therefore, the surrounding conditions of the vehicle 100 may be detected not only by the sensor 140 but also by the image sensor 130.

The sensor 140 may detect the state of the vehicle 100 by including at least one of a vehicle speed sensor detecting a driving speed of the vehicle 100, a steering wheel sensor detecting an angle of a steering wheel 172*a*, an acceleration sensor detecting the acceleration of the vehicle 100, an angular velocity sensor detecting the angular velocity, an accelerator pedal sensor detecting the position of the accelerator pedal, and a braking pedal sensor detecting the position of the braking pedal.

The sensor 140 may further include a proximity sensor detecting an object located in the vicinity of the vehicle 100, thereby detecting the surrounding conditions of the vehicle 100. The proximity sensor may be implemented with at least one of an infrared sensor, an ultrasonic sensor, a RADAR sensor, and a LIDAR sensor. However, the embodiment of the vehicle 100 is not limited to the above example, and thus a variety of devices may be used as a proximity sensor if it can detect an object located in the vicinity of the vehicle 100.

The controller 110 may identify whether a predetermined situation occurs based on at least one of the surrounding image, the vehicle state and the surrounding conditions of the vehicle 100. For this, the controller 110 may monitor the surrounding image and the detection result of the sensor 140 in real time or periodically. The predetermined situation may represent a condition that is defined to inform the adjacent vehicle or other infrastructure of its occurrence. The predetermined situation may include an unexpected situation, an emergency situation, and a certain vehicle state which are described later. According to cases, the certain vehicle state may be contained in the unexpected situation or the emergency situation.

The controller 110 may identify the unexpected situation or the emergency situation shown in the acquired surrounding image, by applying an image processing technique. The controller 110 may identify the unexpected situation or the emergency situation by using a variety of methods such as comparing an image at a normal driving state with the acquired surrounding image, by acquiring characteristics of the image at the unexpected situation or the emergency situation, such as an accident or a construction, and by applying the machine learning.

Further, when an object interrupting the driving of the vehicle 100 is present, the controller 110 may identify that it is an unexpected situation, wherein the presence of the object includes a case in which an adjacent object detected by the sensor 140 is not a normal-road structure or a case in which other vehicle does not normally drive. In addition, the controller 110 may identify the presence of the object that interrupts the driving of the vehicle 100, by analyzing the surrounding image.

For example, when an accident occurs in front of the vehicle 100, construction is in progress, an obstacle is placed on the road, or the front vehicle of the vehicle 100 stops suddenly, the controller 110 may identify that the unexpected situation or the emergency situation described above occurs, based on the surrounding image acquired by the image sensor 130 or the result of the detection of the sensor 140, and the controller 110 may control the external display 120 to inform the rear vehicle of information related to the unexpected situation or the emergency situation.

When the rear vehicle of the vehicle 100 collides with the vehicle 100 from behind, the controller 110 may control the external display 120 to inform the front vehicle of the collision.

The controller 110 may identify whether the vehicle 100 stops suddenly or whether the vehicle 100 has a problem, based on the state of the vehicle sensed by the sensor 140. When it is identified that the vehicle 100 stops suddenly or the vehicle 100 has a problem, the controller 110 may control the external display 120 to inform the adjacent vehicle of information related thereto.

Data, which is used to identify whether the predetermined situation occurs, is not limited to the above mentioned surrounding image or the result of the detection of the sensor 140. For example, as illustrated in FIG. 5, when the vehicle 100 further includes a communicator 180, the communicator 180 may receive information related to the surrounding conditions through a communication with an external device.

For example, the communication unit 180 may receive information on the surrounding road conditions from an external server. In this case, the controller 110 may acquire information on an unexpected situation or an emergency situation covered by the front vehicle or the curvature of the road, and the controller 110 may control the external display 120 to inform the adjacent vehicle of information related thereto.

In addition, the controller 110 may transmit the information provided from the adjacent vehicle to another adjacent vehicle. As will be described later, the image sensor 130 may acquire an image of an external display of the front vehicle or the rear vehicle, and the controller 110 may acquire information displayed on the acquired external display. As needed, the acquired information may be provided to another adjacent vehicle by being displayed on the external display 120 of the vehicle 100.

Figure 6:
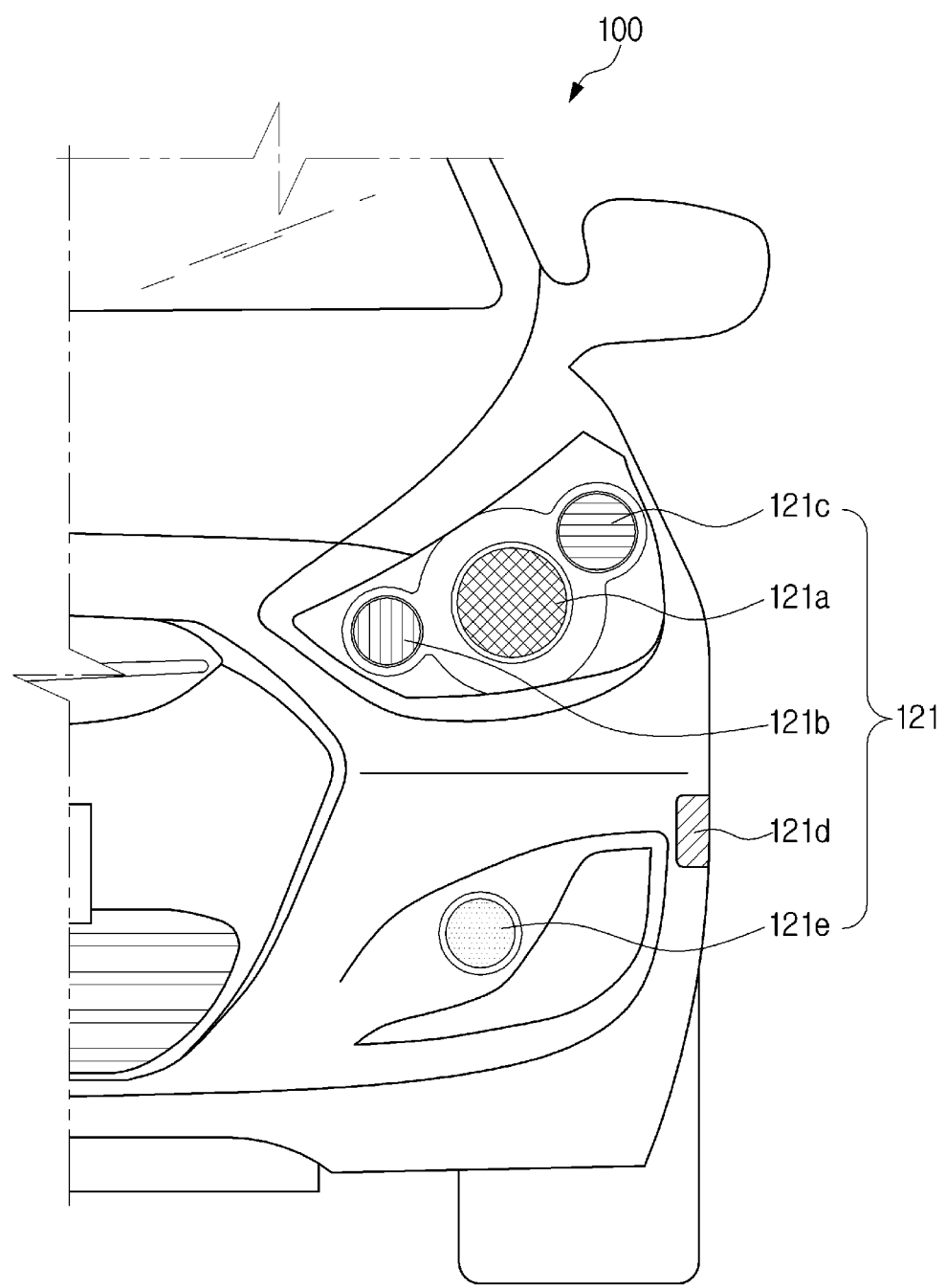
FIG. 6 is a view illustrating an example of a headlamp structure of the vehicle according to an embodiment.
Figure 7:
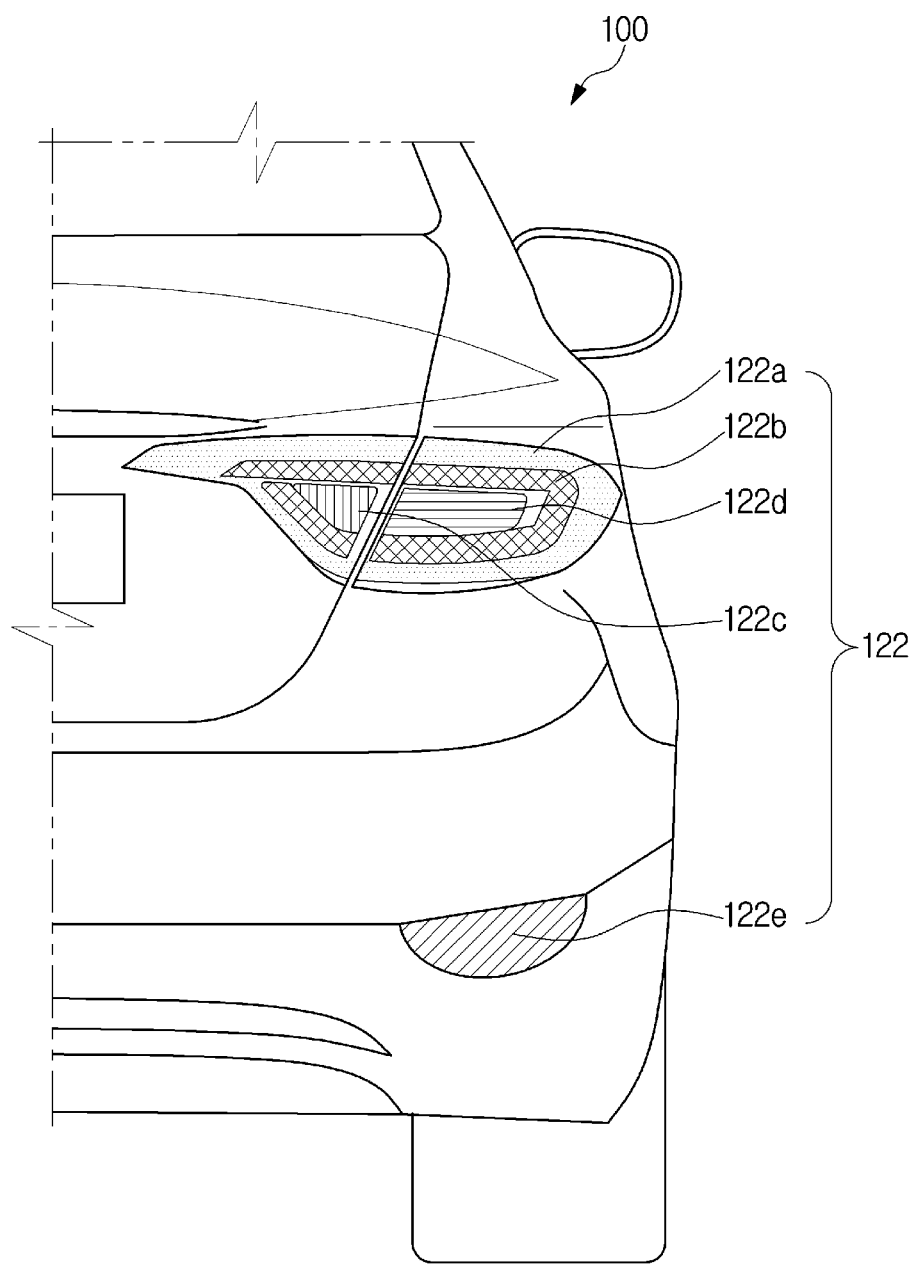
FIG. 7 is a view illustrating an example of a rear lamp structure of the vehicle according to an embodiment.

FIG. 6 is a view illustrating an example of a headlamp structure of the vehicle according to an embodiment, and FIG. 7 is a view illustrating an example of a rear lamp structure of the vehicle according to an embodiment.

As described above, the controller 110 uses the external display 120 to display information to be provided to the adjacent vehicle. The external display 120 may include the head lamp 121 and the rear lamp 122.

The head lamp 121 may be composed of a plurality of lamps that perform various functions. For example, the head lamp 121 may include a low beam 121*a* and a high beam 121*b* securing the visibility of the front in the dark while indicating the presence of the vehicle to the adjacent vehicle or a pedestrian, a signal lamp 121*c* indicating a change of a direction of the vehicle, a side marker light 121*d* indicating the presence and the width of the vehicle in the dark, and a fog light 121*e* identifying the presence of the vehicle or the pedestrian that is close and in the opposite side, in bad weather, such as snow, rain, and fog.

The rear lamp 122 may also be composed of a plurality of lamps that perform various functions. For example, the rear lamp 122 may include a tail lamp 122*a* indicating the presence of the vehicle 100 to the rear vehicle in the dark, a stop lamp 122*b* indicating that the brake is operating, a backup lamp 122*c* indicating that the backward movement of the vehicle 100 to the rear side when the vehicle 100 moves backward, a signal lamp 122*d* indicating a change of a direction of the vehicle, and a rear fog lamp 122*e* assisting the tail lamp in bad weather, such as snow, rain, and fog.

The headlamp 121 and the rear lamp 122 may use various kinds of light sources. For example, the head lamp 121 and the rear lamp 122 may use a halogen lamp, a High Intensity Discharge (HID) lamp, an LED lamp, or a laser lamp.

However, the embodiment of the vehicle 100 is not limited thereto, and in addition to the above-described example, a variety of light sources may be used as the light source of the headlamp 121 and the headlamp 121 if it's flicking and emitting is controlled.

The lamp structure of FIGS. 6 and 7 is merely an example applicable to the vehicle 100 according to an embodiment, and thus the lamp structure may have a different structure according to the type of vehicle and the sales country. For example, in recent years, a day-light has been mounted to a vehicle, wherein the daylight is configured to be turned on as long as the vehicle 100 is started, regardless of conditions such as weather and external brightness.

In addition, the headlamp 121 and the rear lamp 122 are composed of a plurality of lamps, but are not limited thereto. Therefore, it may be possible that a single lamp functions as a plurality of lamps by dividing an area of the single lamp and independently controlling each divided area.

The controller 110 may display information to be provided to the adjacent vehicles by adjusting the flicker frequency of the headlamp 121 and the rear lamp 122. For example, when the controller 110 tries to provide information to the rear vehicle, the controller 110 may adjust at least one of the flicker frequency and the flicker pattern of the rear lamp 122. When the controller 110 tries to provide information to the front vehicle, the controller 110 may adjust at least one of the flicker frequency and the flicker pattern of the headlamp 121.

According to the conventional manner, it may be possible to inform a driver of an adjacent vehicle of the change of direction or the occurrence of the emergency situation, by flickering a turn signal light or an emergency light. However, there is a limit to the visual information that is recognized by a human being. Particularly, the human visual system cannot recognize light or image that flickers with a frequency exceeding a threshold, but recognizes the light or image as continuous light or image. However, since the camera has a threshold frequency higher than the human visual system, the camera may recognize more a variety of visual information than information recognized by a human being.

According to an embodiment, the vehicle 100 may adjust the flicker frequency and the flicker pattern of the external display 120 in various manners according to the information to be displayed. The adjacent vehicle may acquire an image of the external display 120 of the vehicle 100 and acquire information provided from the vehicle 100, by analyzing the flicker frequency and the flicker pattern indicated on the acquired image. The adjacent vehicle may also provide information in the same manner as the vehicle 100, and the vehicle 100 may acquire information provided from the adjacent vehicle in the same manner as the adjacent vehicle.

The controller 110 may control the flicker frequency and the flicker pattern of one of the lamps forming the head lamp 121 and the rear lamp 122 or may adjust the flicker frequency or the flicker pattern by combining two or more lamps.

FIGS. 8 to 12 views illustrating examples of adjusting a flicker frequency and a flicker pattern of a single lamp in various manner.

The controller 110 may implement a certain frequency by dividing the area of a single lamp and alternately flickering the divided areas. For example, as shown in FIGS. 8 to 12, the controller 110 may divide one lamp L of a plurality of lamps forming the headlamp 121 or the rear lamp 122 into two areas A and B, and flicker the area A and the area B with the certain frequency.

For example, the flicker frequency may be selected in the range of 60 Hz to 240 Hz, and the controller 110 may select the flicker frequency based on a predetermined protocol with the adjacent vehicle and other infrastructures, and a frequency range that is recognizable by the image sensor 130. The other infrastructure may include a camera installed in various places on the road or a server for managing traffic (hereinafter, referred to as a traffic management server), wherein the camera may transmit the acquired image to the traffic management server.

Therefore, when the vehicle 100 displays information about the vehicle state and the surrounding situation on the external display 120, the camera installed on the road may acquire an image of the external display 120 and transmit the acquired image to the traffic management server.

When the area A and the area B of the single lamp L is flickered with the frequency exceeding the human-readable threshold, the human eye cannot recognize that the area A and the area B are divided and flickered, but can recognize that the entire of the area of the single lamp L is flickered.

The controller 110 may flicker the entire area of the single lamp L with the certain frequency, without dividing the area of the single lamp L. In this case, when the single lamp L is flickered with the certain frequency exceeding the human-readable threshold, the human eye may not recognize that the single lamp L is flickered but may recognize that the single lamp L is turned on.

Accordingly, the controller 110 may display information on the external display 120 by classifying the information into information provided to the driver of the adjacent vehicle or the pedestrian, and information provided to the adjacent vehicle or the infrastructure having the camera. For example, the controller 110 may inform the driver of the adjacent vehicle or the pedestrian of the presence of the vehicle 100, by turning on the low beam or the tail lamp in the night. Particularly, the controller 110 may provide additional information to the adjacent vehicle and the infrastructure by flickering the low beam or the tail lamp with the frequency in the band recognized by the camera.

The adjacent vehicles may also have the configuration of the vehicle 100 described above and in the following. A protocol for displaying which information with which flicker pattern and flicker frequency between the vehicles or between the vehicle 100 and the infrastructure may be predetermined.

According to the predetermined protocol, the controller 110 may match at least one of the flicker frequency and the flicker pattern of the external display 120 with corresponding information and store the matched information in the memory. The controller 110 may control the external display 120 according to the flicker frequency and the flicker pattern matched with the information to be provided to the adjacent vehicle, the pedestrian and the infrastructure.

When the same flicker frequency is combined with the different flicker pattern, the external display 120 may display different information, and when the same flicker pattern is combined with the different flicker frequency, the external display 120 may display different information.

Figure 8:
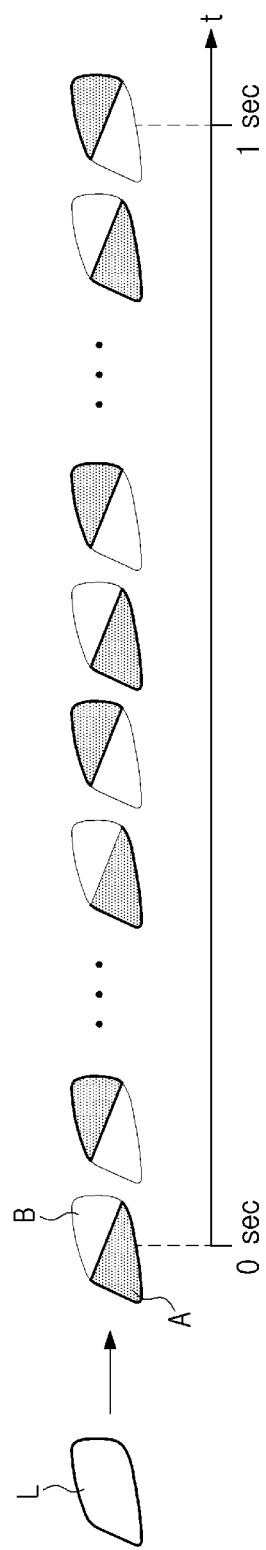
FIGS. 8 to 12 views illustrating examples of adjusting a flicker frequency and a flicker pattern of a single lamp in various manner.

For example, when the information to be provided is the sudden stop of the vehicle 100, the controller 110 may divide the single lamp L in the diagonal direction as shown in FIG. 8 and alternately flicker the area A and the area B with 60 Hz.

Figure 9:
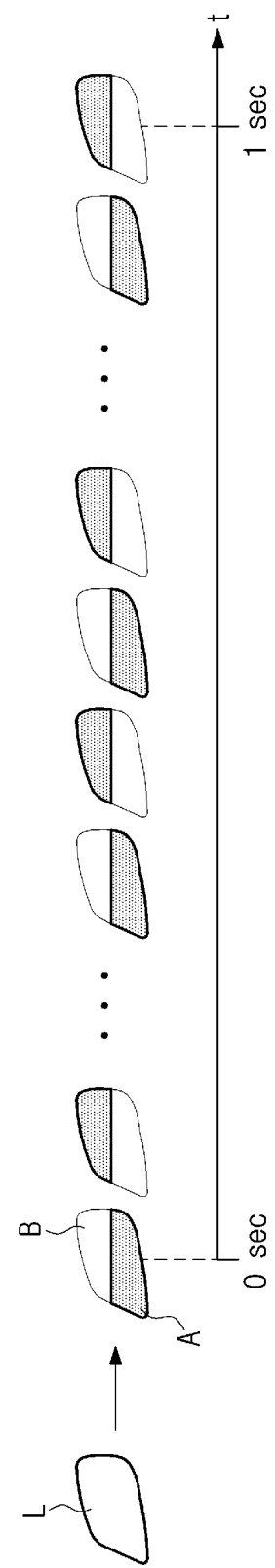

Further, when the information to be provided is an accident on the front or rear side, the controller 110 may divide the single lamp L in the vertical direction as shown in FIG. 9 and alternately flicker the area A and the area B with 60 Hz.

Figure 10:
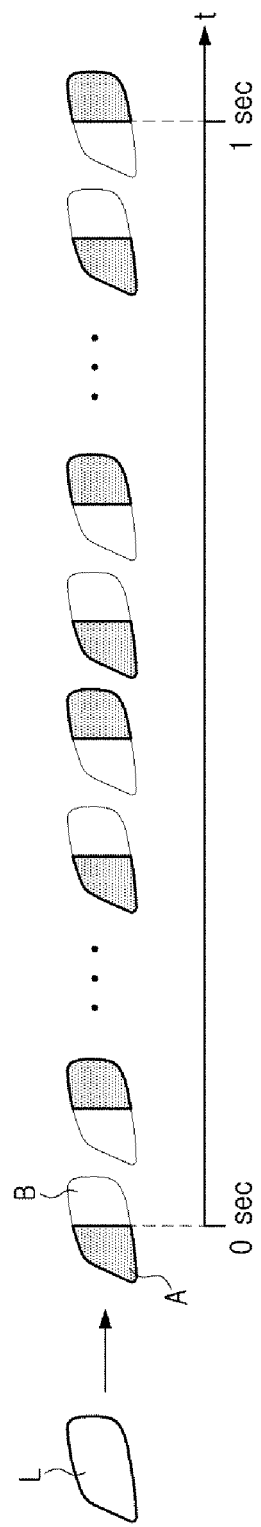

In addition, when the information to be provided is a sharp curve ahead, the controller 110 may divide the single lamp L in the horizontal direction as shown in FIG. 10 and alternately flicker the area A and the area B with 60 Hz.

Figure 11:
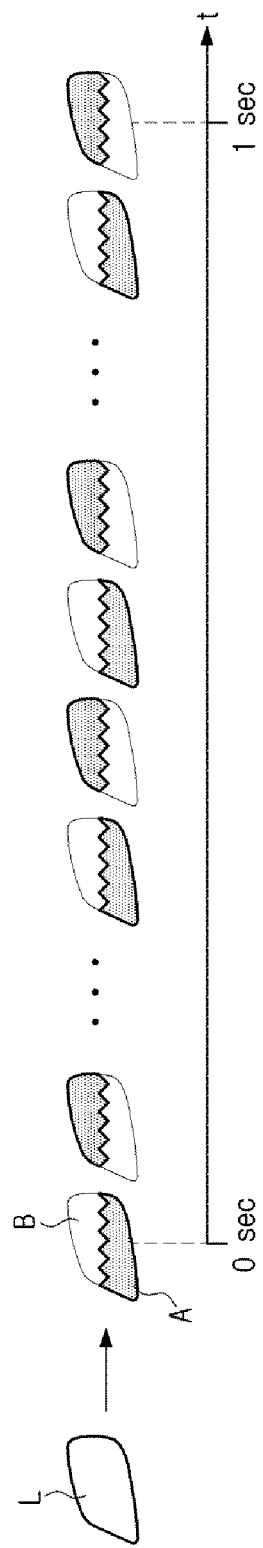
Figure 12:
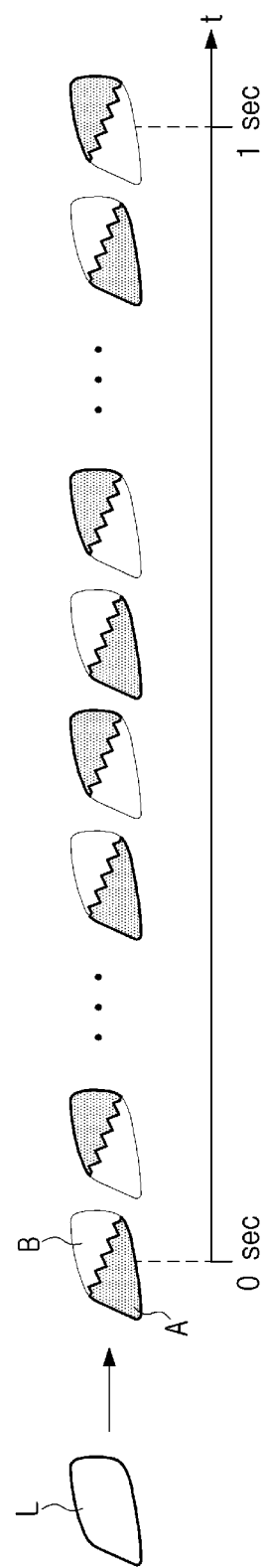

As shown in FIGS. 11 and 12, the single lamp L is divided into the vertical direction or the diagonal direction, and the boundary line is expressed by a saw-tooth shape to indicate information that is different from the information shown in FIG. 8 or 9.

The example of FIGS. 8 to 12 described above is an example in which the same flicker frequency is combined with the different flicker pattern to indicate different information. On the contrary, when the same flicker pattern as FIG. 8 is combined with other flicker frequencies such as 60 Hz, 80 Hz and 120 Hz, they may also indicate different information, and the rest of the flicker patterns may be operated in the same manner.

In spite of flickering the entire area of the single lamp L without dividing the area, it is also possible to display different information for each frequency, or it may be possible to combine a plurality of lamps. Upon combining a plurality of lamps, it may be possible to combine lamps adjacent to each other contained in one side of the left lamp and the right lamp, or it may be possible to combine a lamp contained in the left lamp with a lamp contained in the right lamp.

Figure 13:
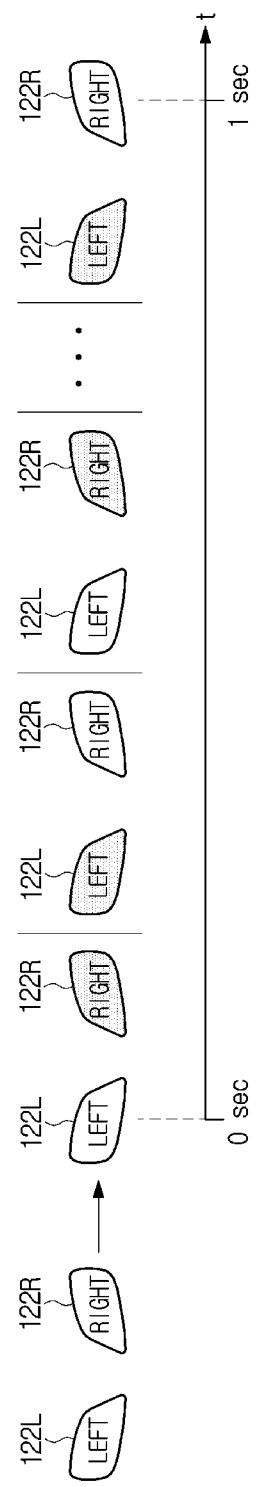
FIGS. 13 and 14 are views illustrating examples of displaying information by combining a left rear lamp and a right rear lamp.
Figure 14:
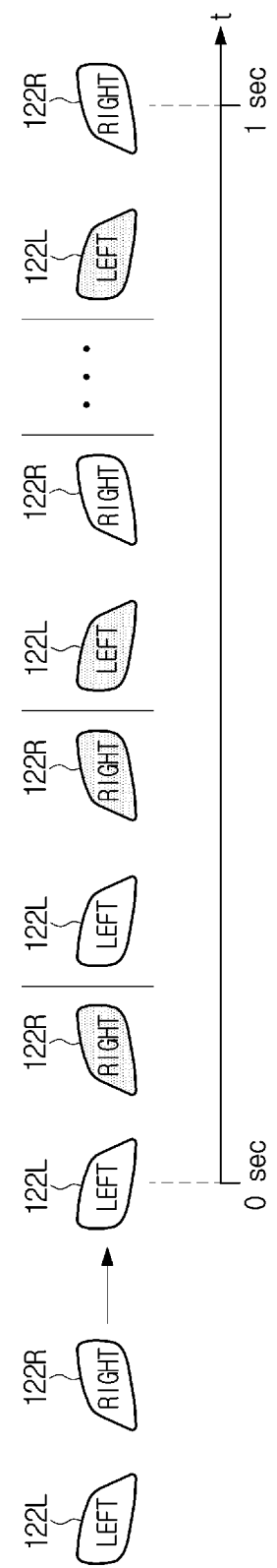

FIGS. 13 and 14 are views illustrating examples of displaying information by combining a left rear lamp and a right rear lamp.

The controller 110 may display information that is predetermined to match with a flickering method such as flickering the left rear lamps 122L and the right rear light 122R in the order as right-left-right-left, as illustrated in FIG. 13 or flickering the left rear lamps 122L and the right rear light 122R in the order as right-right-left-left, as illustrated in FIG. 14.

Meanwhile, the external display 120 mounted on the vehicle 100 may be implemented in various ways in addition to the lamp that displays information by turning on/turning off/flickering as in the above-described example.

Figure 15:
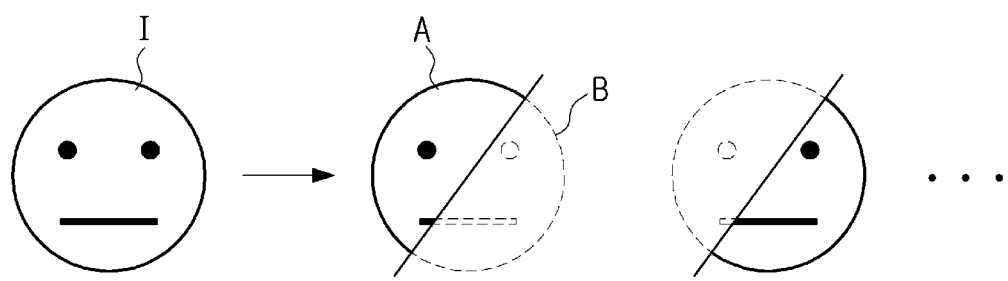
FIG. 15 is a view illustrating an example of adjusting the flicker frequency and the flicker pattern when the external display of the vehicle according to the embodiment can display an image.

FIG. 15 is a view illustrating an example of adjusting the flicker frequency and the flicker pattern when the external display of the vehicle according to the embodiment can display an image.

For example, it is also possible that the external display 120 provided in the vehicle 100 displays an emoticon "I" as shown in FIG. 15. The emoticon "I" may be displayed to provide information to the driver of the adjacent vehicle or the pedestrian.

At this time, the controller 110 may divide an area of the emoticon "I" and alternately flicker an area A and an area B with a frequency exceeding the human-readable threshold, thereby providing predetermined information to the adjacent vehicle or the infrastructure. Therefore, the controller 110 may provide information to the human being such as the driver and the pedestrian and to a machine by using a single image, wherein information provided to the human being is different from information provided to the machine.

As described above, the controller 110 may identify whether the predetermined situation occurs by using the image sensor 130, the sensor 140 or the communicator 180, and display information related to the occurring situation on the external display 120. To this end, the controller 110 may select at least one lamp, which is to display information, among the external display 120, and the flicker frequency and the flicker pattern to display the information.

Figure 16:
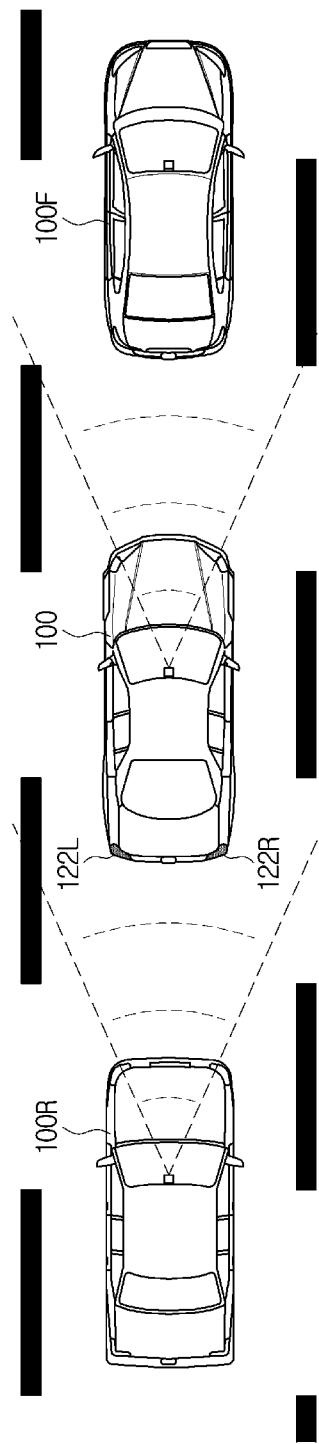
FIG. 16 is a view illustrating an example in which the vehicle according to an embodiment controls the rear lamp to provide information to a rear vehicle.
Figure 17:
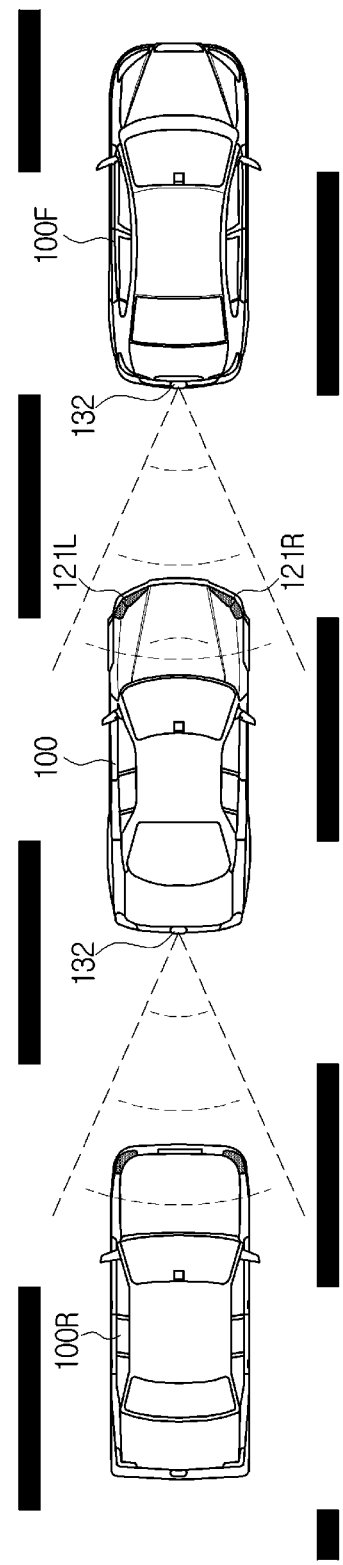
FIG. 17 is a view illustrating an example in which the vehicle according to an embodiment controls the headlamp to provide information to a front vehicle.

FIG. 16 is a view illustrating an example in which the vehicle according to an embodiment controls the rear lamp to provide information to a rear vehicle, and FIG. 17 is a view illustrating an example in which the vehicle according to an embodiment controls the headlamp to provide information to a front vehicle.

When it is identified that the predetermined situation occurs, based on the result of the image sensor 130, the sensor 140 or the communicator 180, the controller 110 may select the front side or the rear side to display the information related to the occurring situation.

For example, when the occurring situation is the emergency situation or the unexpected situation in front of the vehicle 100 or when the occurring situation is the problem in the vehicle 100 that affects the driving of the rear vehicle or when the occurring situation is the sudden stop, the controller 110 may control the external display 120 provided on the rear surface of the vehicle 100 to provide information on the occurring situation. That is, the controller 110 may select the rear lamp 122 as the external display 120 for displaying information as illustrated in FIG. 16.

Further, the controller 110 may select a lamp from the rear ramp 122 to display information. For example, the controller 110 may select a lamp that is already turned on, as a lamp for displaying information.

Particularly, when the tail light 122a is turned on during the night driving or the tunnel running, or the rear fog light 122e is turned on due to the weather, the controller 110 may display information on the occurring situation by using the tail light 122a or the rear fog light 122e that are turned on.

As another example, when the brake control module 171 has a problem during the backward movement of the vehicle 100, or when a collide is expected based on the distance to the rear vehicle even if the vehicle 100 brakes, the controller 110 may display information on the occurring situation by using the backup lamp 122c.

As another example, when the controller 110 has information to be provided to the rear vehicle upon turning on the signal lamp 122d to change the direction, the controller 110 may use the signal lamp 122d that is turned on. When the controller 110 has information to be provided to the rear vehicle upon turning on the emergency light due to the sudden stop of the driver of the vehicle 100, the controller 110 may use the emergency light that is turned on.

When the lamp, which is already turned on, such as the signal lamp 122d and the emergency light, flickers with the frequency recognized by the human being, the controller 110 may provide information on the change of the direction to the driver of the rear vehicle while providing additional information to the rear vehicle, by more quickly flickering the lamp with the frequency exceeding the human-readable threshold, with a period of time when the lamp is turned on.

In addition, the controller 110 may newly turn on a lamp that corresponds to the occurring situation. For example, when the occurring situation is the emergency situation or the unexpected situation, and when the driver of the vehicle 100 does not turn on the emergency light, the controller 110 may display information by adjusting the flicker frequency while turning on the emergency light.

When the occurring situation is the emergency situation or the unexpected situation in the rear side of the vehicle 100 or when the occurring situation is the problem in the vehicle 100 that affects the driving of the front vehicle or when a collide is expected since the distance to the front vehicle is short, the controller 110 may control the external display 120 provided on the front surface of the vehicle 100 to provide information on the occurring situation. That is, the controller 110 may select the headlamp 121 as the external display 120 for displaying information as illustrated in FIG. 17.

In the same manner as selecting the rear lamp 122, the controller 110 may select a lamp among the headlamp 121 for displaying information. For example, the controller 110 may select a lamp already turned on or turn on a new lamp corresponding to the occurring situation.

According to an embodiment, by displaying information by using the lamp, which is already turned on, or the lamp, which is suitable for the situation, the vehicle 100 may prevent a case in which turning on the lamp, which is not suitable for the situation, causes confusion of the driver and disturbs the driving.

The flicker frequency or flicker pattern of the selected lamp may vary depending on the situation. As described above, according to the predetermined protocol, the controller 110 may match at least one of the flicker frequency and the flicker pattern of the external display 120 with corresponding information and store the matched information in the memory. The controller 110 may search for at least one of the flicker frequency and the flicker pattern corresponding to the occurring situation, in the memory, and control the selected lamp according to at least one of the searched flicker frequency and flicker pattern.

Figure 18:
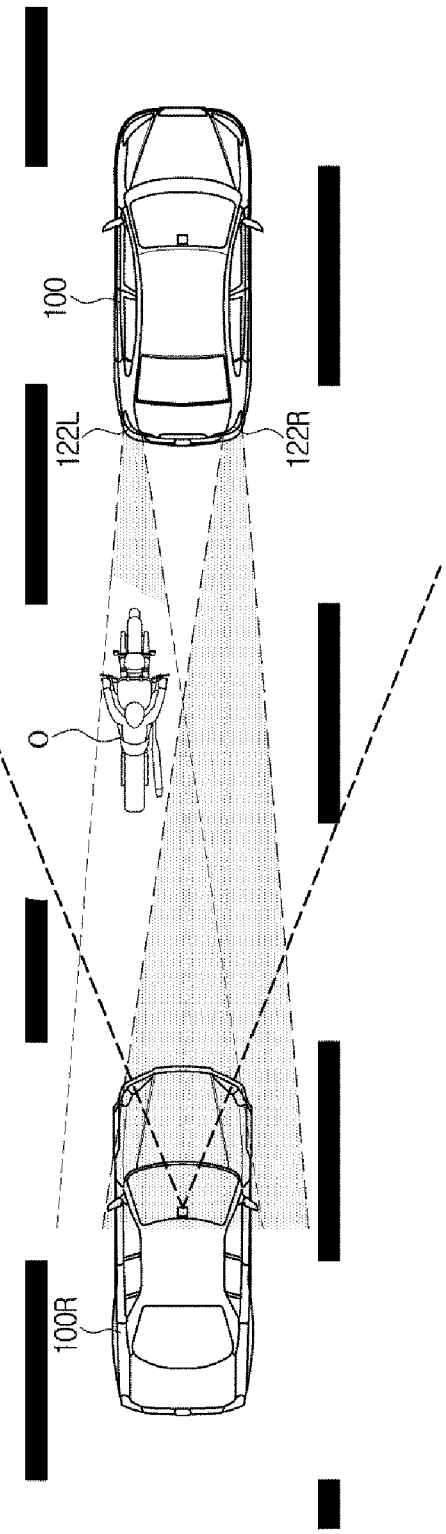
FIG. 18 is a view illustrating an operation in which the vehicle according to an embodiment controls the external display when an obstacle enters between the vehicle and an adjacent vehicle.

FIG. 18 is a view illustrating an operation in which the vehicle according to an embodiment controls the external display when an obstacle enters between the vehicle and an adjacent vehicle, and FIG. 19 is a table illustrating an example of a flicker pattern of the external display based on the distance from the adjacent vehicle.

When an obstacle enters between the adjacent vehicle and the vehicle 100 during the vehicle 100 provides information to the adjacent vehicle by flickering the rear lamp 122 or the headlamp 121, a part of the flickering lamp may be covered.

The controller 110 may identify whether an obstacle enters based on the surrounding image acquired by the image sensor 130 or an output value of the sensor 140. When it is identified that the obstacle covers a part of the flickering lamp, the controller 110 may display the same information by using the lamp not covered.

For example, illustrated in FIG. 18, when an obstacle O enters and covers a part of the left rear lamp 122L during the vehicle 100 provides information to the rear vehicle 100R by flickering the left rear lamp 122L and the right rear lamp 122R, in the same manner as in FIG. 13, the controller 110 may provide the same information to the rear vehicle 100R by dividing an area of the right rear light 122R into an area A and an area B and alternately flickering the area A and the area B, as illustrated in FIG. 8.

The flicker frequency and the flicker pattern that is recognizable may vary according to the specification of the camera provided in the adjacent vehicle. Although the camera has the same specification, the flicker frequency and the flicker pattern that is recognizable may vary according to the distance to the external display 120. In general, as an inter-vehicle distance increases, the flicker frequency that is recognizable becomes smaller and it becomes difficult to distinguish the flicker patterns that are small or complex.

Therefore, the controller 110 may measure the distance between the adjacent vehicle, to which information is provided, and the vehicle 100, by using the sensor 140 and the image sensor 130, and differently control the flicker pattern of the external display 120 based on the measured distance. For this, the controller 110 may store a table about a pattern, which is displayable for each distance to the adjacent vehicle, and adjust the pattern displayed on the external display 120 based on the measured distance and the stored table, as illustrated in FIG. 19.

For example, when the inter-vehicle distance D is less than a first reference value R1 as illustrated in FIG. 19, the controller 110 may identify the flicker patterns to be recognizable by the adjacent vehicle, wherein the flicker patterns include the flicker pattern (left and right lamp pattern) using the left and right lamps, as illustrated in FIGS. 13 and 14, the flicker pattern (simple pattern) performed by dividing an area of one side lamp, as illustrated in FIGS. 8 to 19, and the modified flicker pattern performed by dividing an area of one side lamp and then by putting the shape into the border line, as illustrated in FIGS. 11 and 12. Therefore, it may be possible to use any flicker pattern among them.

When the inter-vehicle distance D is equal to or greater than the first reference value R1 and less than a second reference value R2, it may be identified that the adjacent vehicle cannot recognize the modified pattern and thus it may be possible to use the simple pattern or the left and right lamp pattern.

When the inter-vehicle distance D is equal to or greater than the second reference value R2, it may be identified that the adjacent vehicle cannot recognize the modified pattern and the simple pattern and thus it may be possible to use the left and right lamp pattern.

Two sets of the flicker frequency and the flicker pattern corresponding to the same information may be stored in the vehicle 100 and the adjacent vehicle to display the same information with the different flicker pattern and the different flicker frequency according to the entry of the obstacle and the inter-vehicle distance, as illustrated in FIGS. 18 and 19.

For example, the flicker pattern corresponding to the same information may be stored in two sets of the case of using the left and right ramp and the case of dividing the area of one lamp. When the distance to the adjacent vehicle to which information is provided is less than the second reference value R2, the information may be displayed by dividing the area of one lamp. When the distance to the adjacent vehicle to which information is provided is equal to or greater than the second reference value R2, the information may be displayed by using the left and right lamp.

Further, when there is no obstacle between the vehicle and the adjacent vehicle, to which information is provided, the information may be displayed by using the left and right lamp. When there is an obstacle between the vehicle and the adjacent vehicle, to which information is provided, the information may be displayed by dividing the area of one lamp.

As described above, the adjacent vehicle may also display information through the external display 120 according to the above-described manner. The controller 110 may identify the information, which is displayed on the external display 120 by the adjacent vehicle, based on the surrounding image acquired by the image sensor 130, and control the vehicle 100 based on the identified information.

Hereinafter, a more detailed embodiment will be described.

Figure 20:
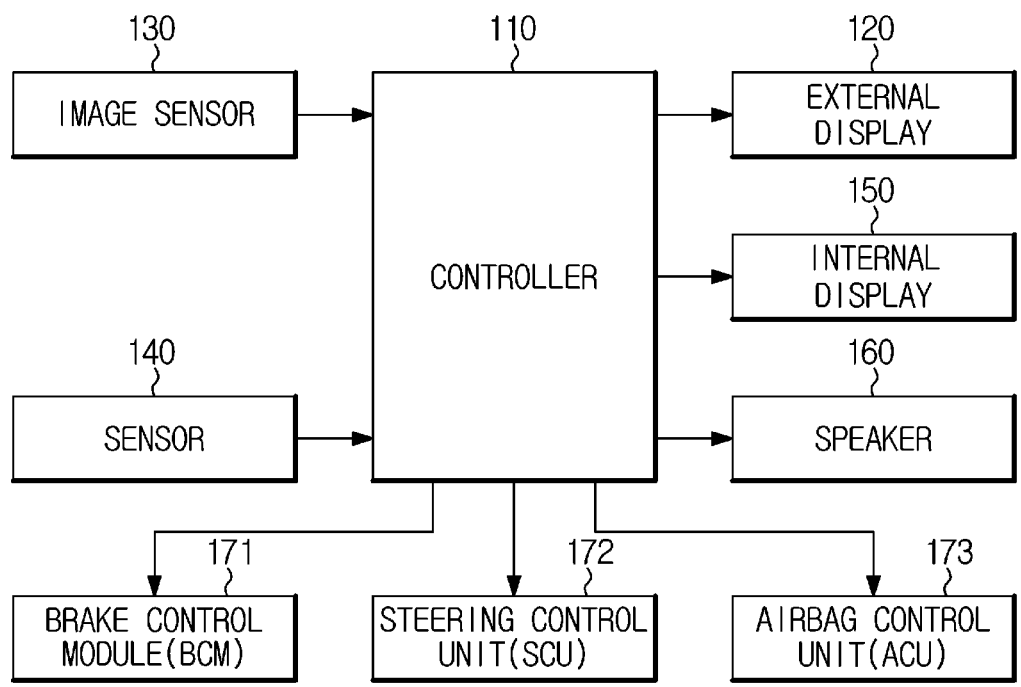
FIG. 20 is a control block diagram illustrating an embodiment of controlling the vehicle based on information provided from an adjacent vehicle.
Figure 21:
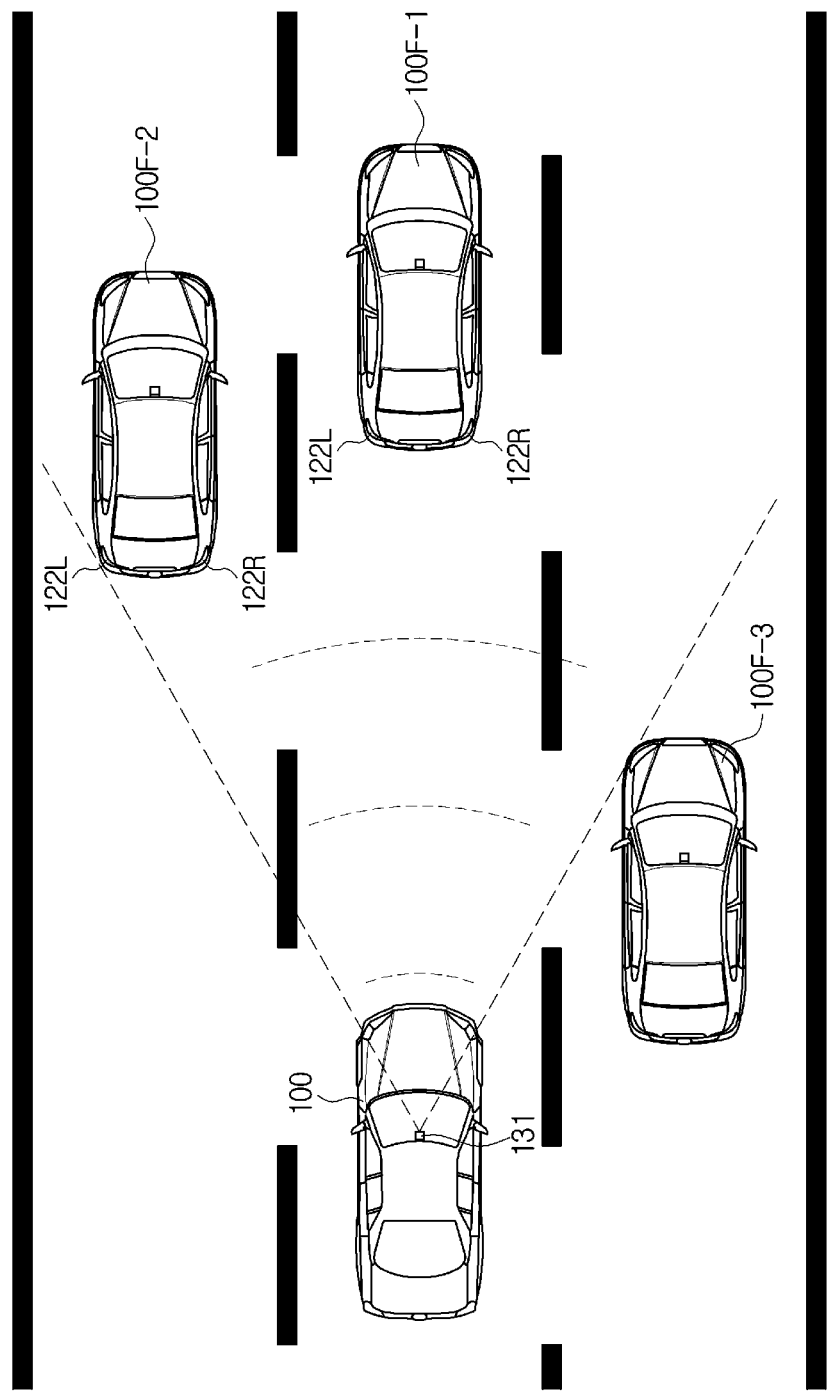
FIG. 21 is a view illustrating a vehicle acquiring an image of an adjacent vehicle for obtaining information.

FIG. 20 is a control block diagram illustrating an embodiment of controlling the vehicle based on information provided from an adjacent vehicle, and FIG. 21 is a view illustrating a vehicle acquiring an image of an adjacent vehicle for obtaining information.

Referring to FIG. 20, according to an embodiment, the vehicle 100 may further include a steering control unit (SCU) 170 adjusting the driving direction of the vehicle 100 and an airbag control unit (ACU) 190 deploying in an emergency to protect the occupant.

As described above, the vehicle 100 may acquire a front image by using the front camera 131, and a rear image by using the rear camera 132. It may be possible to acquire an image of the lateral side of the vehicle 100 according to the angle of the view of the camera. In addition it may be possible to acquire an image of the lateral side of the vehicle 100 by mounting a lateral side camera on the lateral side of the vehicle 100, as well as the front camera 131 and the rear camera 132.

Referring to an example of FIG. 21, the vehicle 100 may acquire an image of the front vehicle 100E-1 by using the front camera 131, and the rear lamp 122 of the front vehicle 100E-1 may be indicated on the acquired image. In addition, according to the view angle of the front camera 131, it may be possible to acquire an image of the front vehicle 100E-2 driving on a lane that is next to a lane on which the vehicle 100 drives as well as the front vehicle 100E-1 driving on the same lane.

In the example of FIG. 21, the case where the front camera 131 is used to acquire an image of the front vehicle is described. However, it may be possible to acquire an image of the rear vehicle by using the rear camera 131.

The controller 110 may acquire at least one of the flicker pattern and the flicker frequency of the external display 120 displayed on the surrounding image by monitoring the surrounding image, which is acquired by the image sensor 130, in real time or periodically.

As described above, since the flicker pattern and the flicker frequency are matched with corresponding information and then the matched information is stored, the controller 110 may identify what information corresponding to the identified flicker pattern and flicker frequency, which is information indicating the identified flicker pattern and flicker frequency, represents. The information may be information on the occurring situation identified by the adjacent vehicle, that is, information provided by the adjacent vehicle.

The controller 110 may control the vehicle 100 according to the identified information. When the Advanced Driver Assistance System (ADAS) function is installed in the vehicle 100, the controller 110 may automatically control the brake control module 171, the steering control unit 172, and the airbag control unit 173.

For example, when the identified information indicates the unexpected situation or the emergency situation occurring in the front, the controller 110 may control the brake control module 171 for the sudden stop and control the steering control unit 172 for changing the direction. When it is determined that it is difficult to avoid the collision, the controller 110 may control the airbag control unit 173 to deploy the air bag.

Here, the brake control module (BCM) 171 may include ABS and ESC as described above, the control the steering control unit 172 may include an electric power steering control unit (PSCU), an electronic power steering (EPS) system or the like, and the airbag control unit (ACU) 173 may include an SRS airbag module, etc.

In addition, the controller 110 may visually provide information on the occurring situation to the driver by controlling the internal display 150, and audibly provide information on the occurring situation to the driver by controlling the speaker 160. Alternatively, the controller 110 may tactually provide the same information to the driver by controlling the steering wheel 172a or a vibrator provided in the driver seat 106a.

Hereinafter, an embodiment of controlling method of the vehicle will be described. The vehicle 100 according to the above-described embodiment may be used for the controlling method of the vehicle. Therefore, the contents described above with reference to FIGS. 1 to 21 may be similarly applied to the controlling method of the vehicle.

Figure 22:
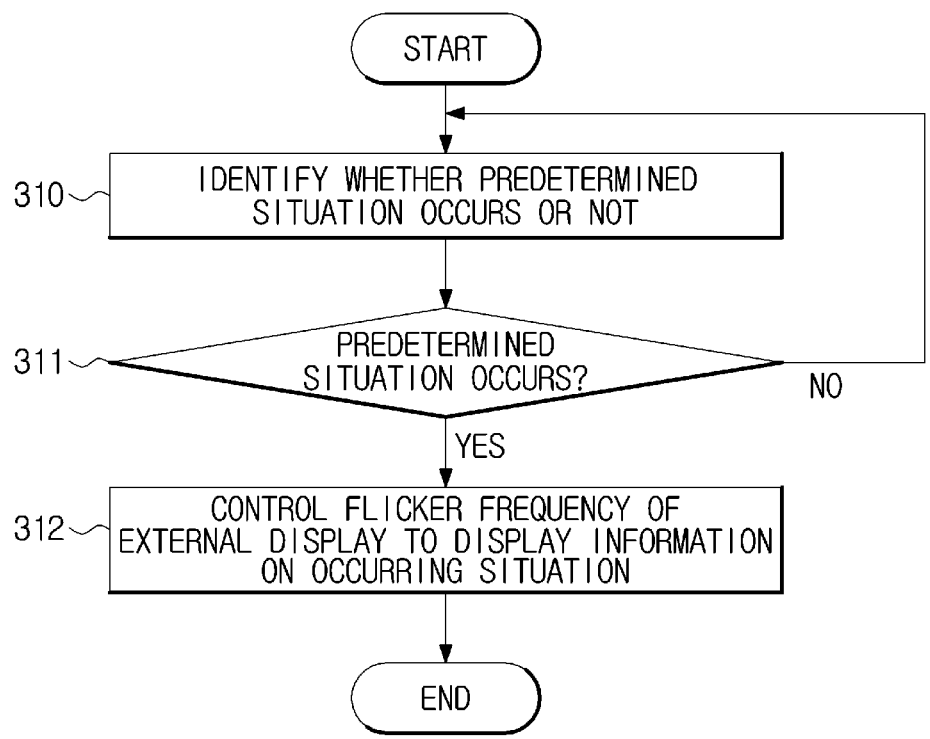
FIGS. 22 and 23 are flowcharts of a control method of the vehicle according to an embodiment.
Figure 23:
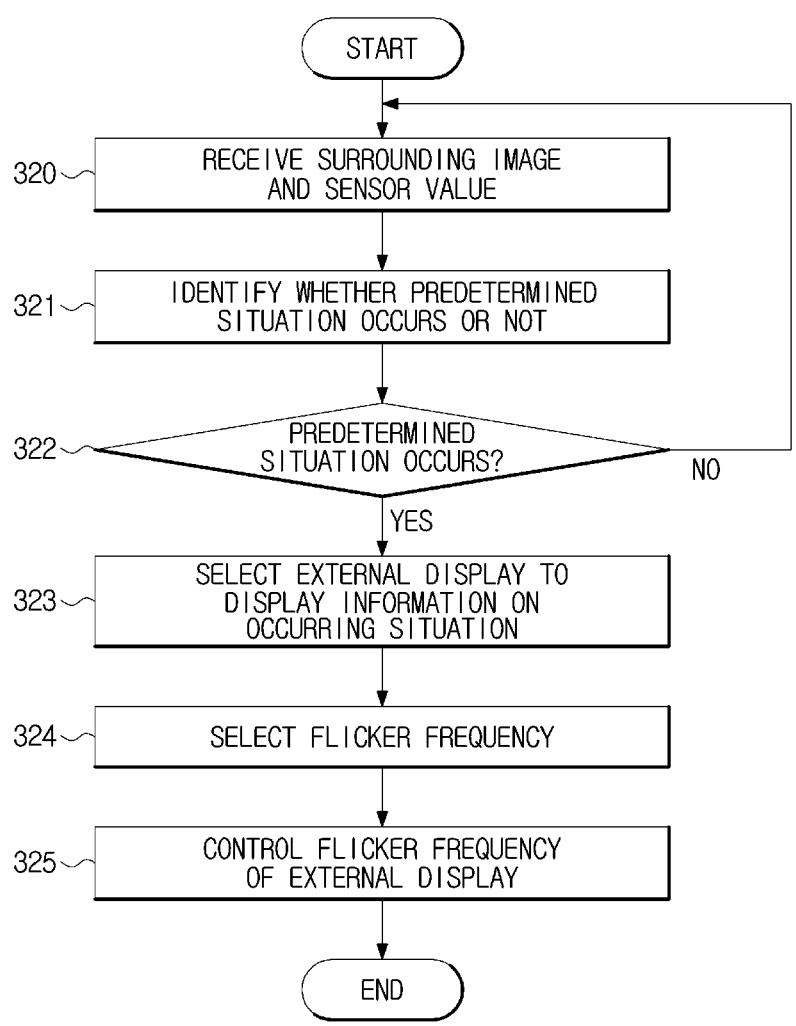

FIGS. 22 and 23 are flowcharts of a control method of the vehicle according to an embodiment.

Referring to FIG. 22, the controller 110 of the vehicle 100 identifies whether a predetermined situation occurs (310). The predetermined situation represents a situation that is defined to inform the adjacent vehicle or the other infrastructure of the occurrence of the situation, and the predetermined situation may include an unexpected situation, an emergency situation, or a certain state of the vehicle.

When it is identified that a predetermined situation occurs (yes in 311), the controller 110 may control the flicker frequency of the external display 120 to display information about the occurring situation (312). The flicker frequency corresponding to the information about the occurring situation may be stored in advance in the memory, and the flicker pattern may be stored together with the flicker frequency. The controller 110 may display a variety of information by the combination of the flicker frequency and the flicker pattern. For example, when the same flicker frequency is combined with another flicker pattern, different information may be displayed. When the same flicker pattern is combined with another flicker frequency, different information may be displayed. The control of the flicker frequency and the flicker pattern of the external display 120 is the same as that described above with reference to FIGS. 8 to 15.

FIG. 23 is a flowchart that is more detailed flowchart of FIG. 22. Referring to FIG. 23, the controller 110 may receive the surrounding image from the image sensor 130, and receive a sensor value from the sensor 140 (320). The sensor value may represent an output value of the sensor 140. When an external device corresponding to the communicator 180 that is communicable is provided in the vehicle 100, the controller 110 may receive information on the surrounding situation through the communicator 180.

The controller 110 identifies whether the predetermined situation occurs, based on the surrounding image received from the image sensor 130, the output value of the sensor 140, and the information on the surrounding situation received through the communicator 180 (321).

When it is identified that the predetermined situation occurs (yes in 321), the controller 110 selects the external display 120 to display information on the occurring situation (323). Particularly, the controller 110 may select one of the head lamp 121 and the rear lamp 122 based on the position where the situation occurs or the position of the target vehicle to which the information is provided. For example, when the position where the situation occurs is the front side and the position of the target vehicle to which the information is the rear side, the controller 110 may select the rear lamp 122 as the external display 120 to display information.

Further, the controller 110 may select a lamp for displaying the information among the plurality of lamps forming the headlamp 121 or the rear lamp 122. For example, the controller 110 may select a lamp that is already turned on, as a lamp for displaying information, or may select a new lamp corresponding to the occurring situation and turn the new lamp on.

The controller 110 selects the flicker frequency used in the control of the selected lamp (324) and control the flicker frequency of the external display 120 according to the selected flicker frequency (325). The controller 110 may also select and control the flicker pattern.

In addition, the controller 110 may differently control the flicker pattern or the flicker frequency to display the same information according to the entry of the obstacle, and the inter-vehicle distance. For example, the flicker pattern corresponding to the same information may be stored in two sets of the case of using the left and right lamp and the case of dividing the area of one lamp. When the distance to the adjacent vehicle to which information is provided is less than the second reference value R2, the information may be displayed by dividing the area of one lamp. When the distance to the adjacent vehicle to which information is provided is equal to or greater than the second reference value R2, the information may be displayed by using the left and right lamp.

Further, when there is no obstacle between the vehicle and the adjacent vehicle, to which information is provided, the information may be displayed by using the left and right lamp. When there is an obstacle between the vehicle and the adjacent vehicle, to which information is provided, the information may be displayed by dividing the area of one lamp.

Figure 24:
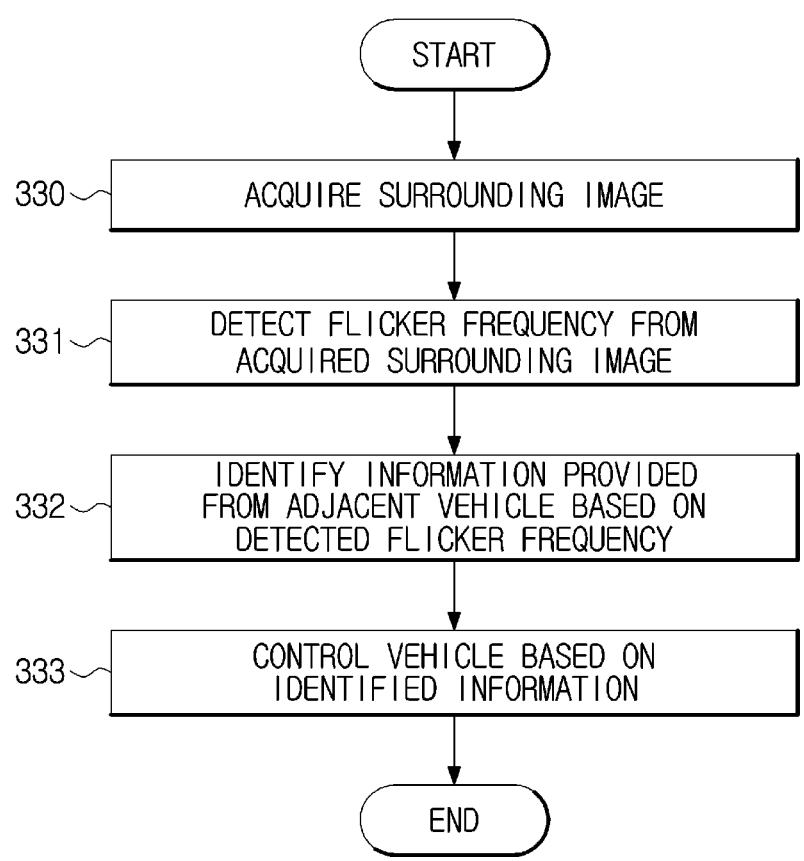
FIG. 24 is a flowchart of a control method of the vehicle according to an embodiment when information is provided from an adjacent vehicle.

FIG. 24 is a flowchart of a control method of the vehicle according to an embodiment when information is provided from an adjacent vehicle.

Referring to FIG. 24, the image sensor 130 acquires the surrounding image (330). The surrounding image may include the adjacent vehicle. An external display of the front vehicle or an external display of the rear vehicle may appear on the surrounding image depending on whether the acquired surrounding image is a front image or a rear image.

The controller 110 detects the flicker frequency from the acquired surrounding image (331). For this, the controller 110 may monitor the surrounding images in real time or periodically. On the other hand, the camera contained in the image sensor 130 may be configured to recognize the flicker frequency exceeding the human-readable threshold. Accordingly, the image sensor 130 may recognize the flicker frequency of the surrounding image even if the flicker frequency is too fast to be recognized by the human being.

As described above, even when the same flicker frequency is combined with another flicker patterns, different information may be displayed. Accordingly, the controller 110 may detect the flicker pattern from the acquired surrounding image.

The controller 110 identifies the information provided by the adjacent vehicle based on the detected flicker frequency (332). When the flicker pattern is also detected, the controller 110 may identify the information provided by the adjacent vehicle by considering the flicker pattern. In the memory, information may be matched with the flicker pattern and the flicker frequency and the matched information for each flicker pattern and flicker frequency may be stored. Accordingly, the controller 110 may search for the information corresponding to the flicker pattern and the flicker frequency detected in the memory.

The controller 110 controls the vehicle 100 based on the identified information (333). When the ADAS function is installed in the vehicle 100, the controller 110 may automatically control the brake control module 171, the steering control unit 172 and the airbag control unit 173.

For example, when the identified information indicates the unexpected situation or the emergency situation occurring in the front, the controller 110 may control the brake control module 171 for the sudden stop and control the steering control unit 172 for changing the direction. When it is identified that it is difficult to avoid the collision, the controller 110 may control the airbag control unit 173 to deploy the air bag.

In addition, the controller 110 may visually provide information on the occurring situation to the driver by controlling the internal display 150, and audibly provide information on the occurring situation to the driver by controlling the speaker 160. Alternatively, the controller 110 may tactually provide the same information to the driver by controlling the steering wheel 172a or a vibrator provided in the driver seat 106a.

According to the embodiment of the vehicle and the control method described above, necessary information may be exchanged between vehicles by using a display and a camera mounted to the vehicle although there is no separate communication module for vehicle-to-vehicle communication (V2V).

Particularly, it may be possible to provide information necessary for the adjacent vehicle in a simple manner such as adjusting the flicker frequency and the flicker pattern of the external display of the vehicle.

Further, by using a camera capable of recognizing the flicker frequency exceeding the human-readable threshold, it is possible to classify information into information provided to the human being and information provided to the vehicle.

As is apparent from the above description, the vehicle and the control method of the vehicle provide information to the adjacent vehicle by adjusting the flicker frequency of the external display provided in the vehicle and acquire information by acquiring an image of the external display of the adjacent vehicle, thereby simply and precisely exchanging needed information between vehicles without using a separate communication module.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
an image sensor configured to acquire a surrounding image and to recognize a flicker frequency indicated on the surrounding image;
a sensor configured to detect at least one of a vehicle state or a surrounding condition of the vehicle;
an external display disposed on an outer side of the vehicle; and
a controller configured to:
identify whether a predetermined situation occurs based on at least one of the acquired surrounding image or an output value of the sensor,
analyze the flicker frequency and a flicker pattern indicated on the surrounding image,
acquire information based on the flicker frequency and the flicker pattern, and
control at least one of the flicker frequency or the flicker pattern of the external display to display the information on an occurring situation when the predetermined situation occurs,
wherein the flicker frequency is contained in a reference range, wherein the reference range comprises the flicker frequency exceeding a human-readable threshold.

2. The vehicle of claim 1, wherein
the controller selects at least one of the flicker frequency or the flicker pattern based on the occurring situation, and controls the external display according to the selected at least one of the flicker frequency or the flicker pattern.

3. The vehicle of claim 1, wherein
the image sensor comprises at least one camera configured to recognize the flicker frequency exceeding the threshold.

4. The vehicle of claim 1, wherein
the external display comprises at least one of a headlamp on a front surface of the vehicle or a rear lamp on a rear surface of the vehicle.

5. The vehicle of claim 4, wherein
when the occurring situation is a situation occurring in front of the vehicle or a situation affecting to a rear vehicle located behind the vehicle, the controller controls at least one of a flicker frequency or a flicker pattern of the rear lamp to provide information related to the occurring situation to the rear vehicle.

6. The vehicle of claim 4, wherein
when the occurring situation is a situation occurring in a rear side of the vehicle or a situation affecting to a front vehicle located in front of the vehicle, the controller controls at least one of a flicker frequency or a flicker pattern of the headlamp to provide information related to the occurring situation to the front vehicle.

7. The vehicle of claim 1, wherein
the external display comprises a plurality of lamps configured to perform functions different from each other, and
the controller selects at least one lamp among the plurality of lamps to display information related to the occurring situation.

8. The vehicle of claim 7, wherein
the controller selects a lamp, which is already turned on, among the plurality of lamps to display the information related to the occurring situation.

9. The vehicle of claim 7, wherein
the controller selects a lamp corresponding to the occurring situation among the plurality of lamps to display the information related to the occurring situation.

10. The vehicle of claim 1, wherein
the controller controls at least one of the flicker frequency or the flicker pattern of the external display, based on at least one of a distance between the vehicle and an adjacent vehicle, or the presence of an obstacle between the vehicle and the adjacent vehicle.

11. The vehicle of claim 1, wherein
the controller identifies at least one of the flicker frequency or the flicker pattern of the external display indicated on the surrounding image.

12. The vehicle of claim 11, wherein
the controller identifies information indicated by the identified flicker frequency and the flicker pattern, and controls the vehicle based on the identified information.

13. A control method of a vehicle comprising steps of:
identifying, by a controller, whether a predetermined situation occurs based on at least one of a surrounding image acquired by a camera of the vehicle, a vehicle state, or a surrounding situation of the vehicle detected by a sensor of the vehicle;
analyzing, by the controller, a flicker frequency and a flicker pattern indicated on the surrounding image;
acquiring, by the controller, information based on the flicker frequency and the flicker pattern; and
controlling, by the controller, at least one of the flicker frequency or the flicker pattern of the external display to display the information on an occurring situation when the predetermined situation occurs,
wherein the flicker frequency is contained in a reference range, wherein the reference range comprises the flicker frequency exceeding a human-readable threshold.

14. The control method of claim 13, wherein the step of controlling comprises steps of:
selecting at least one of the flicker frequency or the flicker pattern based on the occurring situation; and
controlling the external display according to the selected at least one of the flicker frequency or the flicker pattern.

15. The control method of claim 13, wherein
the camera of the vehicle is configured to recognize the flicker frequency exceeding the threshold.

16. The control method of claim 13, wherein
the external display comprises at least one of a headlamp on a front surface of the vehicle, or a rear lamp on a rear surface of the vehicle.

17. The control method of claim 16, wherein the step of controlling comprises a step of:
when the occurring situation is a situation occurring in front of the vehicle or a situation affecting to a rear vehicle located behind the vehicle, controlling at least one of a flicker frequency or a flicker pattern of the rear lamp to provide information related to the occurring situation to the rear vehicle.

18. The control method of claim 16, wherein the step of controlling comprises a step of:
when the occurring situation is a situation occurring in a rear side of the vehicle or a situation affecting to a front vehicle located in front of the vehicle, controlling at least one of a flicker frequency or a flicker pattern of the headlamp to provide information related to the occurring situation to the front vehicle.

19. The control method of claim 13, wherein
the external display comprises a plurality of lamps configured to perform functions different from each other, and
the control of at least one of the flicker frequency or the flicker pattern of the external display comprises selecting at least one lamp among the plurality of lamps to display information related to the occurring situation.

20. The control method of claim 19, wherein
the selection of at least one lamp comprises selecting a lamp, which is already turned on, among the plurality of lamps, as a lamp to display the information related to the occurring situation.

21. The control method of claim 19, wherein
the selection of at least one lamp comprises selecting a lamp corresponding to the occurring situation among the plurality of lamps, as a lamp to display the information related to the occurring situation.

22. The control method of claim 13, wherein
the control of at least one of the flicker frequency or the flicker pattern of the external display comprises controlling at least one of the flicker frequency or the flicker pattern of the external display, based on at least one of a distance between the vehicle and the adjacent vehicle, or the presence of an obstacle between the vehicle and the adjacent vehicle.

23. The control method of claim 13, further comprising:
identifying at least one of the flicker frequency or the flicker pattern of the external display displayed on the surrounding image.

24. The control method of claim 23, further comprising:
identifying information indicated by at least one of the identified flicker frequency or the identified flicker pattern; and
controlling the vehicle based on the identified information.

* * * * *